US006795422B2

(12) United States Patent
Ohsuge (10) Patent No.: US 6,795,422 B2
(45) Date of Patent: *Sep. 21, 2004

(54) METHOD OF PROVIDING HYSTERESIS IN DETECTION OF PATH TIMING BY MULTIPLYING DELAY PROFILE BY WEIGHTING COEFFICIENT (75) Inventor: Michihiro Ohsuge, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,662

(22) Filed: Sep. 27, 1999

(65) Prior Publication Data

US 2003/0026233 A1 Feb. 6, 2003

(30) Foreign Application Priority Data

Sep. 30, 1998 (JP) ............................................. 10-276291

(51) Int. Cl.[7] .............................. H04B 7/216; H04B 7/10
(52) U.S. Cl. ........................ 370/342; 375/349; 375/347; 375/267
(58) Field of Search ................................. 375/349, 350, 375/136, 142, 143, 144, 147, 150, 152, 347, 267; 370/335, 342, 441; 455/132, 137, 502, 509, 450, 452.1

(56) References Cited

U.S. PATENT DOCUMENTS

| 5,812,542 | A | * | 9/1998 | Bruckert et al. ............. 370/335 |
| 5,999,560 | A | * | 12/1999 | Ono ........................... 375/148 |
| 6,157,687 | A | * | 12/2000 | Ono ........................... 370/335 |
| 6,208,683 | B1 | * | 3/2001 | Mizuguchi et al. ......... 375/140 |
| 6,222,834 | B1 | * | 4/2001 | Kondo ........................ 370/342 |
| 6,229,840 | B1 | * | 5/2001 | Ichihara ...................... 375/147 |
| 6,229,842 | B1 | * | 5/2001 | Schulist et al. ............. 375/148 |
| 6,256,338 | B1 | * | 7/2001 | Jalloul et al. ................ 370/342 |
| 6,272,167 | B1 | * | 8/2001 | Ono ........................... 370/335 |
| 6,333,934 | B1 | * | 12/2001 | Miura ........................ 370/335 |
| 6,345,046 | B1 | * | 2/2002 | Tanaka ....................... 370/342 |
| 6,370,183 | B1 | * | 4/2002 | Newson et al. ............. 370/320 |
| 2002/0187814 | A1 | * | 12/2002 | Yoshida ................... 455/562.1 |
| 2004/0091021 | A1 | * | 5/2004 | Arima ........................ 375/147 |

FOREIGN PATENT DOCUMENTS

| JP | 7-231278 | 8/1995 |
| JP | 8-116303 | 5/1996 |
| JP | 8-181636 | 7/1996 |
| JP | 9-181704 | 7/1997 |
| JP | 10-112673 | 4/1998 |
| JP | 10-117157 | 5/1998 |
| JP | 10-164011 | 6/1998 |
| JP | 11-8606 | 1/1999 |
| WO | WO 95/12262 | 5/1995 |
| WO | WO 98/29960 | 7/1998 |

* cited by examiner

Primary Examiner—Erika Gary
Assistant Examiner—Eliseo Ramos-Feliciano
(74) Attorney, Agent, or Firm—Scully, Scott, Murphy & Presser (57) ABSTRACT A method of allocating a plurality of paths to finger receivers by multiplying a delay profile by a weighting coefficient to provide hysteresis for detection of path timing is disclosed. Signals received at an antenna are down-converted at a high-frequency reception circuit and converted to digital signals at an A/D converter. A sliding correlator derives a delay profile from the digitally converted signals. A delay profile power adder averages path variations due to fading or the like for the delay profile. The delay profile after the path variations are averaged is multiplied by a weighting coefficient from a state weighting section at a multiplier in a weighting unit. A correlation peak position detecting unit detects upper N path timing from the delay profile multiplied by the weighting coefficient. The detected path timing is notified from a rake path allocating unit to respective finger receivers.

34 Claims, 12 Drawing Sheets

METHOD OF PROVIDING HYSTERESIS IN DETECTION OF PATH TIMING BY MULTIPLYING DELAY PROFILE BY WEIGHTING COEFFICIENT

BACKGROUND OF THE INVENTION

1. Field of the Invention

The present invention relates to a CDMA receiver, and more particularly to a method of measuring a delay profile, detecting a plurality of paths with high signal power within the measured range, and allocating the plurality of paths to finger receivers.

2. Description of the Related Art

DS-CDMA (Direct Sequence-Code Division Multiple Access) is a method in which a plurality of communicators use the same frequency band for communication. In this method, communicators are identified by the use of spreading codes.

In mobile communications, when a plurality of radio waves simultaneously propagate to the same receiver, interference occurs between the plurality of radio waves with different propagation delay times because of varying propagation path lengths of the radio waves. In DS-CDMA communication, information data is spread with spreading codes at a higher rate with a shorter period than propagation time. For this reason, radio waves with different propagation delay times can be separated and extracted.

Movements of a mobile station change the positional relationship between the mobile station and a base station, and hence the delay profile, which is signal power distribution with respect to delay time, also changes over time. Signals propagating along paths other than paths in which a base station is directly viewed from a mobile station are varied in accordance with the Rayleigh distribution.

In DS-CDMA communication, a plurality of path signals separated in terms of time with different propagation delay times and changing in accordance with the Rayleigh distributions are in-phase combined (rake combined) to obtain a diversity effect, thereby improving reception characteristics. Specifically, the diversity effect obtained by performing the rake combination makes it possible to reduce the transmission power required to achieve certain reception quality (bit error rate). In other words, interference power with other users inside or outside the same cell is reduced, so that subscriber capacity can be increased in a certain frequency bandwidth.

However, the relative positional change of a mobile station with respect to a base station as described above causes variations in delay profile as well as variations in delay time of paths to be rake combined. Therefore, in a mobile communication environment, a receiver requires a multipath search, tracking function for following variations in delay profile to allow instantaneous rake combination of the plurality of paths that can provide maximum signal power.

Figure 1:
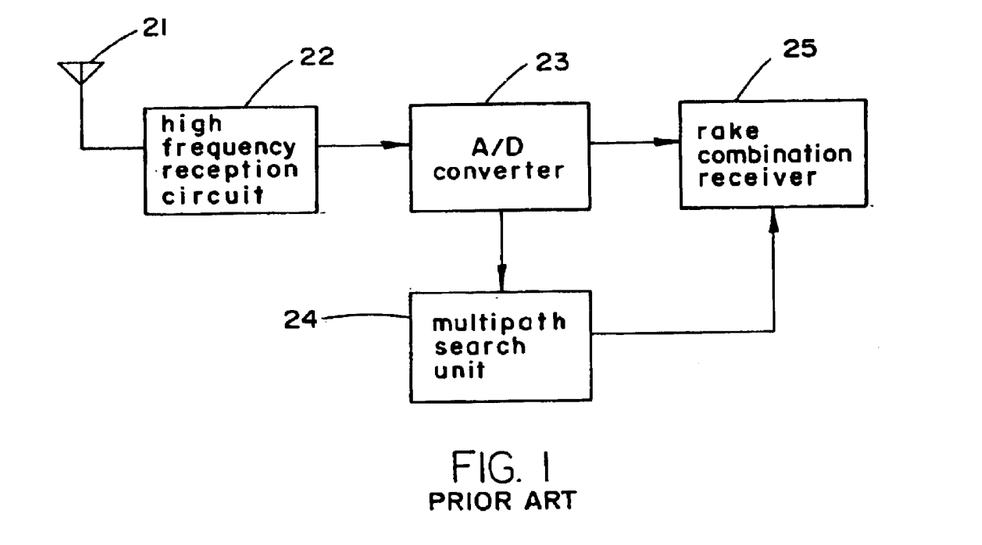
FIG. 1 is a block diagram showing a configuration of a prior art CDMA receiver.

For example, as shown in FIG. 1, a CDMA receiver as described above comprises multipath search unit (multipath detecting means) 24 in a communication environment, rake combination receiver 25 for in-phase combining (rake combining) a plurality of paths, antenna 21, high-frequency reception circuit 22, and A/D (analogue/digital) converter 23.

In such a conventional CDMA receive system, multipath search unit 24 measures a delay profile, selects several paths with high signal power within the delay profile, and notifies the timing of the paths to rake combination receiver 25. Rake combination receiver 25 performs despread for each path based on the timing information for rake combination to obtain a path diversity effect.

Rake combination receiver 25 may have means (path tracking means) for tracking the movement of a particularly specified path, in which case multipath search unit 24 need notify path information to rake combination receiver 25 at least initially or at regular intervals. The CDMA receiver and multipath search method are disclosed in Japanese Patent Application Laid Open No.181704/1997 or the like.

Figure 2:
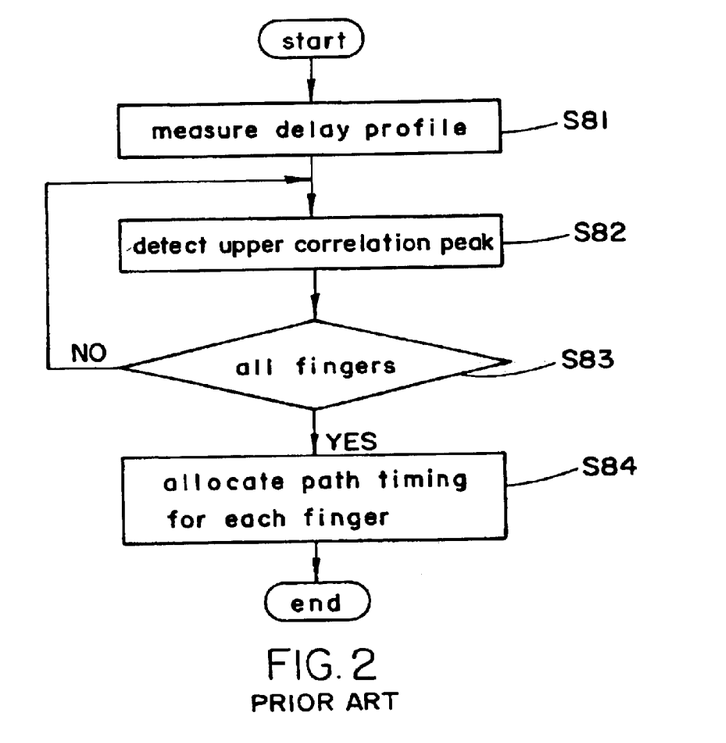
FIG. 2 is a flow chart showing a prior art method of allocating multipath to fingers.

On the other hand, a conventional method of allocating multipath to fingers is illustrated in FIG. 2. In the method, at step S81, a delay profile for propagation paths is first measured with a matched filter or sliding correlator. Next, at steps S82 and S83, upper correlation peaks are detected from the measured delay profile, the number of the detected upper correlation peaks being equal to the number of fingers possessed by a rake receiver. At step S84, the detected path timing is allocated as despread timing for each finger.

In the aforementioned conventional method of allocating a plurality of paths to finger receivers, when pilot interpolation synchronous detection is performed in which pilot symbols included periodically in a received signal are used to estimate phases of respective information symbols using the phase of the pilot symbol as a reference phase, the phase of the pilot hops at the switching of paths allocated to a finger, thereby temporarily failing to provide symbol synchronization with the pilot interpolation. As a result, reception characteristics are deteriorated unless the switching of respective finger paths is minimized as much as possible.

Additionally, in the aforementioned method, when a delay profile has the third correlation peak and the fourth correlation peak with substantially equal powers in a rake receiver having three fingers, the third path timing and the fourth path timing are frequently interchanged depending on variations in propagation path. This causes frequent switching of allocated path timing (despread timing) in one of the fingers, resulting in significantly deteriorated reception characteristics.

Taking a receiver with one finger as another example for simplifying description, when a delay profile with two paths at equal levels is measured, path A or path B is allocated to the finger depending on slight variations in received level. Such frequent switching of paths leads to deteriorated reception characteristics.

SUMMARY OF THE INVENTION

It is an object of the present invention to provide a CDMA receiver for improving reception characteristics by preventing frequent changes of path allocation to finger receivers, and a method for allocating a plurality of paths to finger receivers.

The CDMA receiver according to present invention has calculating means, operational means, and search means. The calculating means calculates a state weighting coefficient based on the present path allocation to a plurality of finger receivers. The operational means performs a predetermined operation between the calculated state weighting coefficient and a delay profile. The search means searches for paths based on the weighted delay profile.

According to one embodiment of the present invention, the CDMA receiver further includes allocating means. The allocating means allocates the plurality of paths detected by the search means to the plurality of finger receivers respectively.

Specifically, in the CDMA receiver according to the present invention, state weighting calculated on the basis of the present state of allocation to rake fingers is performed for a measured delay profile in a multipath search unit of a rake receiver, which provides hysteresis for path switching level of fingers to make it possible to prevent frequent switching of paths which leads to deteriorated characteristics. This leads to improvement in reception characteristics.

Additionally, path timing for finger receivers can be protected even when a path is temporarily lost due to shadowing or the like, resulting in improved reception characteristics. Furthermore, since conditional branch decision in path switching or the like is simplified, configurations of hardware or software can be simplified.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 3:
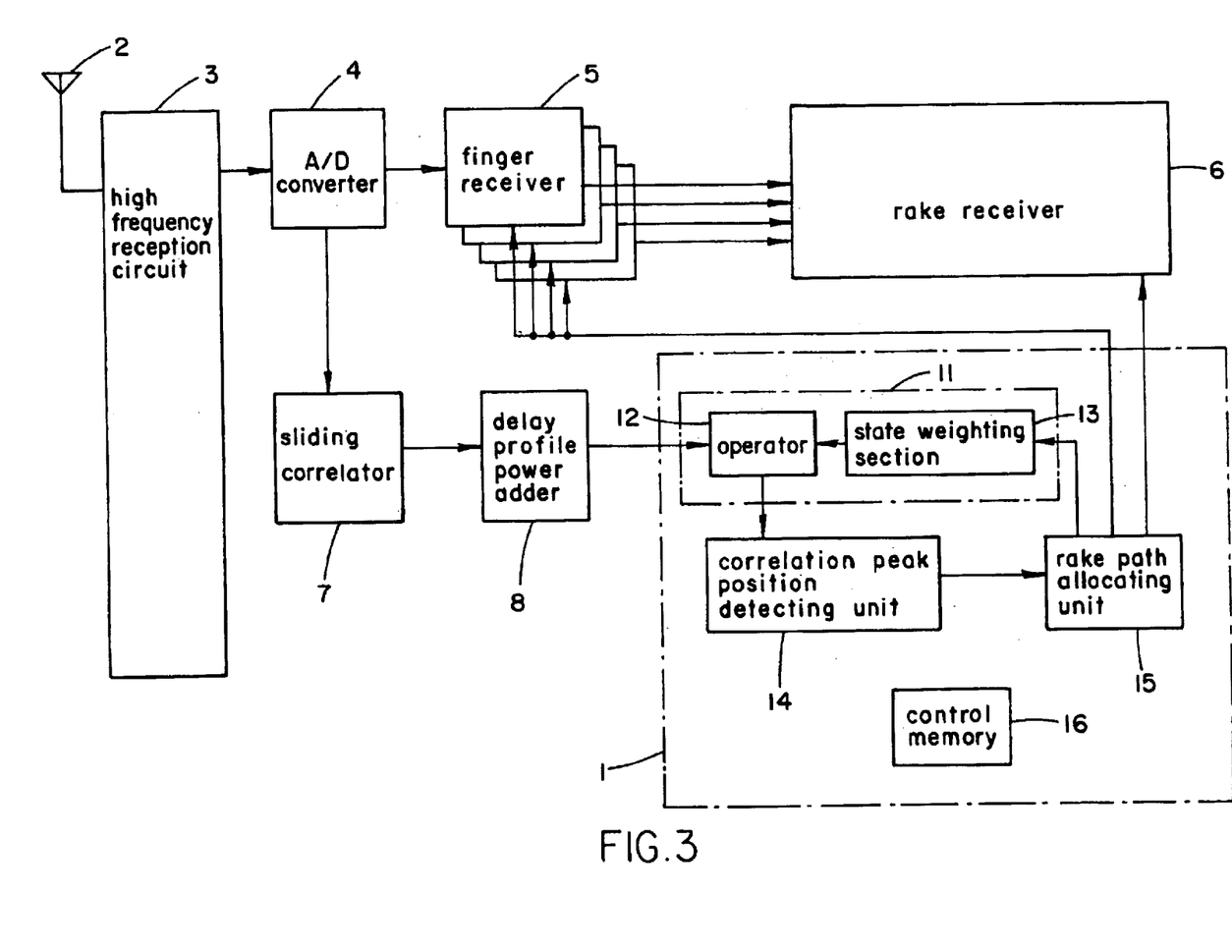
FIG. 3 is a block diagram showing a configuration of a multipath search unit according to an embodiment of the present invention.

Referring now to FIG. 3, a CDMA receiver of a first embodiment according to the present invention is shown which comprises a multipath search unit 1, an antenna 2, a high-frequency reception circuit 3, an A/D converter 4, a plurality of finger receivers 5, a rake receiver 6, a sliding correlator 7 as delay profile measuring means, and a delay profile power adder 8.

In this embodiment, multipath search unit 1 is implemented with a DSP (digital signal processor) and operates under program control.

Each of finger receivers 5 performs despread for one path allocated thereto within digital signals received from A/D converter 4. Rake receiver 6 performs in-phase combination (rake combination) of received signals from finger receivers 5. Delay profile power adder 8 is constituted of hardware or a processor such as a DSP.

Multipath search unit 1 comprises a weighting unit 11, a correlation peak position detecting unit 14, a rake path allocating unit 15, and a control memory 16. Weighting unit 11 includes a operator 12 and a state weighting section 13 which sets weighting determined on the basis of the present state of allocation to fingers.

Correlation peak position detecting unit 14 searches a plurality of paths from a delay profile measured by delay profile power adder 8. Rake path allocating unit 15 allocates the plurality of paths detected at correlation peak position detecting unit 14 to respective finger receivers 5. Control memory 16 stores programs executed by respective units in multipath search unit 1.

Multipath search unit 1 is not necessarily comprised of a DSP dedicated to path search, and may also be provided with other functions such as speech codec.

Figure 4:
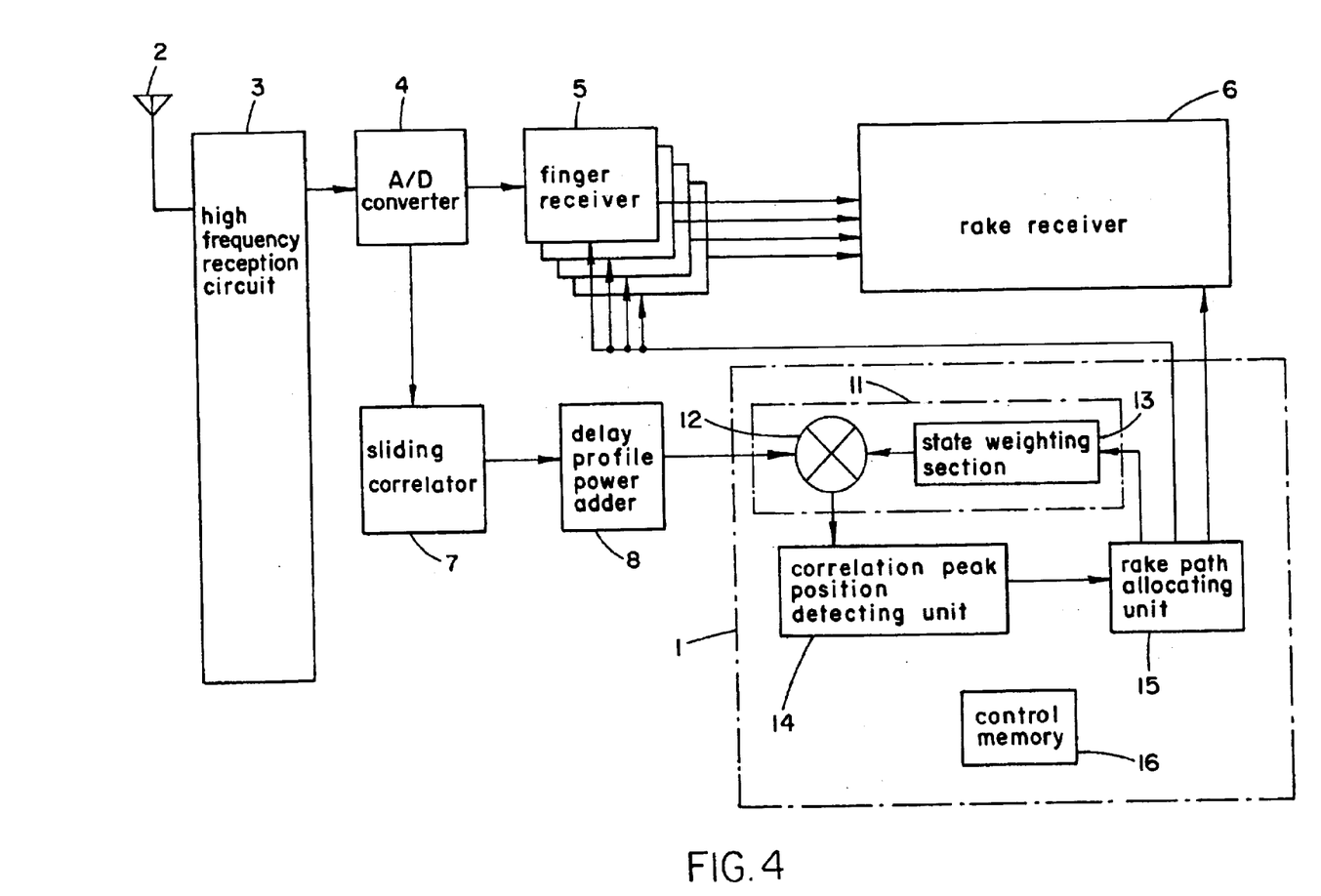
FIG. 4 is a block diagram showing a configuration of a multipath search unit of a CDMA receiver according to an embodiment of the present invention.

Operator 12 may be configured in the form of adder or multiplier for weighting positions allocated to finger receivers 5, or subtracter, divider or the like for weighting positions which are not allocated to finger receivers 5. FIG. 4 shows a configuration in which operator 12 is in the from of a multiplier.

Figure 5A:
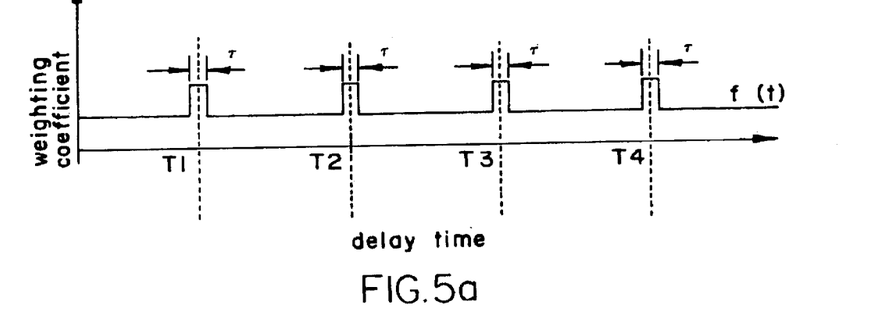
FIG. 5a is a graph showing an example of a weighting coefficient for used in an embodiment of the present invention.
Figure 5B:
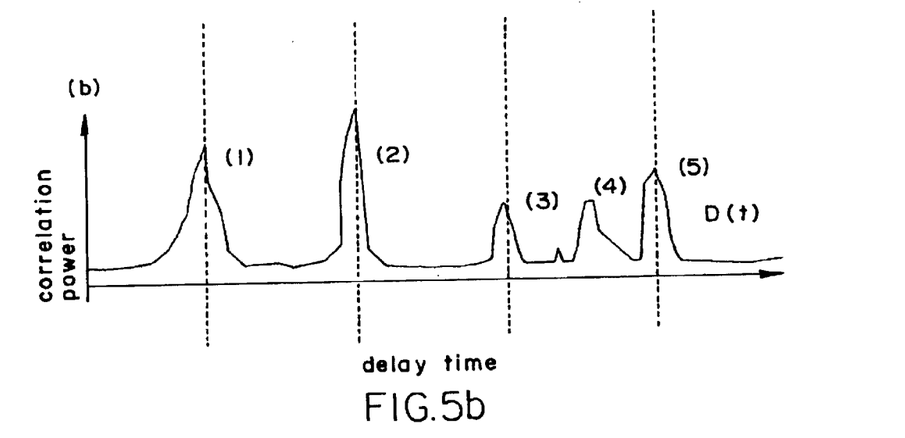
FIG. 5b is a graph showing an example of a delay profile for use in an embodiment of the present invention.
Figure 5C:
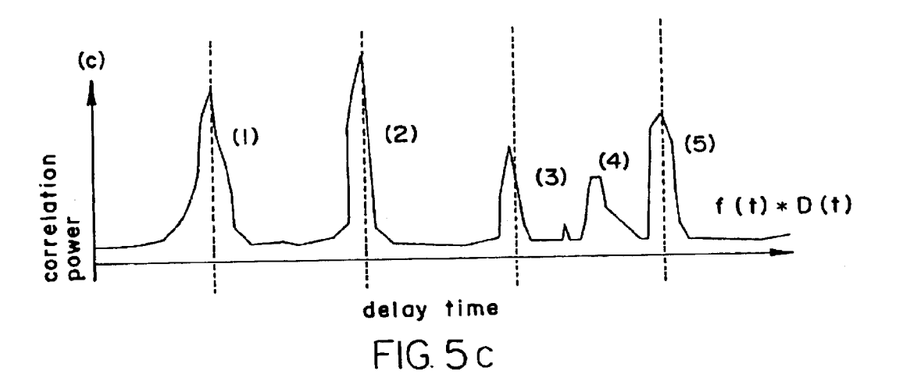
FIG. 5c is a graph showing an output from a multiplier shown in FIG. 3.

FIGS. 5a, 5b and 5c are graphs showing a weighting procedure with weighting unit 11 in FIG. 3. FIG. 5a shows weighting coefficient f(t), FIG. 5b shows delay profile D(t), and FIG. 5c shows f(t)*D(t) which is an output from multiplier 12 shown in FIG. 3.

Figure 6:
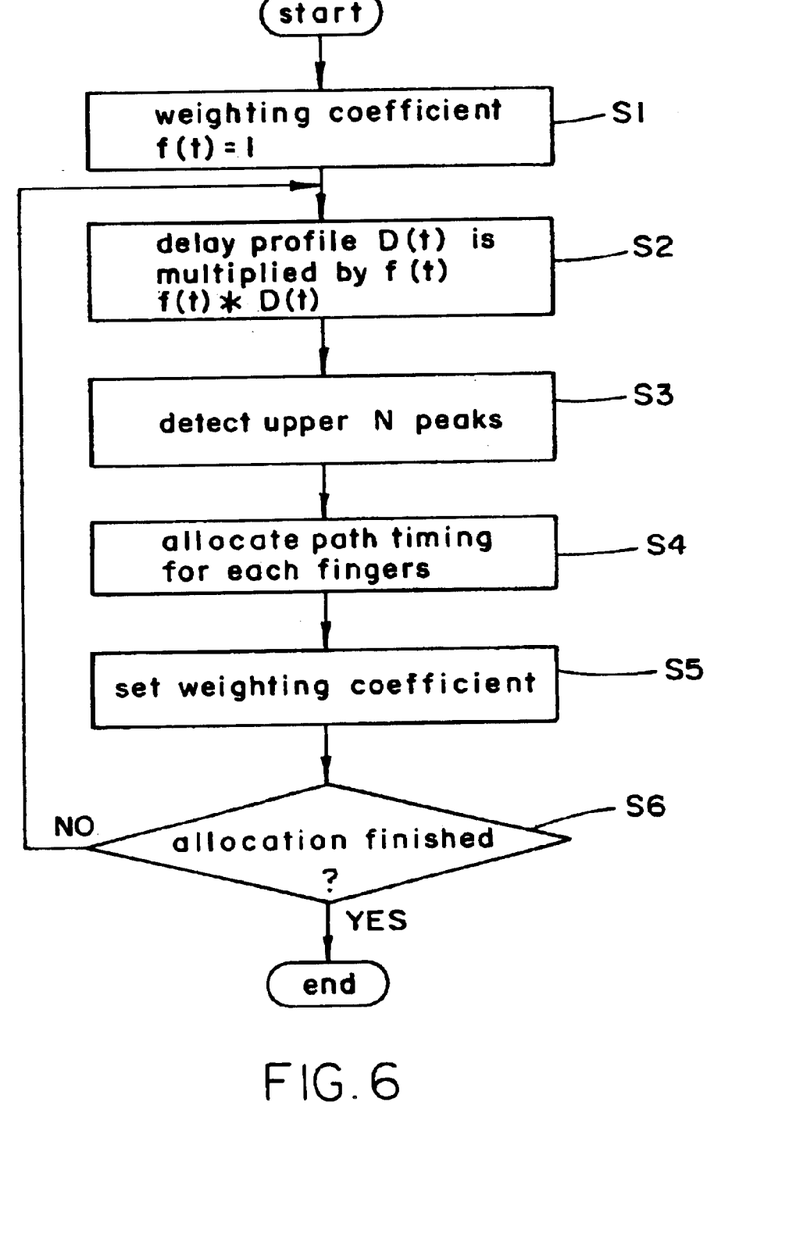
FIG. 6 is a flow chart showing a procedure of a multipath search unit according to an embodiment of the present invention.

The procesure of multipath search unit 1 according to the embodiment will be described in detail with reference to FIG. 4 to FIG. 6. It should be noted that the procedure shown in FIG. 6 is implemented by multipath search unit 1 executing programs stored in control memory 16. As control memory 16, a ROM (read only memory), floppy disk or the like can be used.

At step S1, state weighting section 13 sets weighting coefficient f(t)=1 at the start of a path allocating procedure. Thereafter, signals received at antenna 2 are down-converted at high-frequency reception circuit 3, and converted to digital signals at A/D converter 4. Sliding correlator 7 measures a delay profile from the digitally converted signals at A/D converter 4.

Delay profile power adder 8 averages the delay profiles measured at sliding correlator 7 over a plurality of times to reduce the effect of path variations resulting from fading or the like. At step S2, delay profile D(t), after the effect of path variations is reduced at delay profile power adder 8, is multiplied by weighting coefficient f(t) from state weighting section 13 at multiplier 12 in weighting unit 11.

At step S3, correlation peak position detecting unit 14 detects upper N peaks from a plurality of peaks included in delay profile [f(t)*D(t)] multiplied by weighting coefficient f(t) at multiplier 12 in weighting unit 11 to measure the path timing of the detected N peaks, where N represents the number of finger receivers 5.

At step S4, rake path allocating unit 15 sends the path timing measured at correlation peak position detecting unit 14 to respective finger receivers 5. At step S5, state weighting section 13 sets weighting coefficient f(t) in state weighting based on the allocated path timing to finger receivers 5. Specifically, state weighting section 13 sets weighting coefficient f(t) such that peak values at positions where paths are presently allocated are high.

For example, weighting coefficient f(t) is obtained with the following equation:

$$f(t) = 1 + (\alpha - 1) \sum_{i}^{n} G\tau(t - Ti)$$ (equation 1)

$$|t| \leq \tau/2 \quad G\tau(t) = 1$$
$$|t| > \tau/2 \quad G\tau(t) = 0$$

where n is the number of finger receivers 5, Ti is despread timing (multipath delay time) allocated to each finger receiver 5, and τ is a width near a correlation peak. In this equation, a coefficient which satisfies α>1 (for example, α is equal to approximately 1.5) may be set, or width τ near a correlation peak may be of the order of one chip.

At step S6, a check is made to determine whether path allocation is completed, and the procedure returns to step S2 if is not completed. Accordingly, procedures from S2 to S5 are repeatedly performed until path allocation is completed. As a result, when a delay profile is measured next time, data on paths allocated presently to respective finger receivers 5 is handled with high priority as shown in FIG. 5.

In FIGS. 5a, 5b and 5c, in order for finger receiver 5 allocated to path (3) to switch to path (4), path (4) need have correlation power α times larger than in path (3). In this manner, it is possible to provide hysteresis for replacement of paths, and frequent replacement of paths can be prevented between path (3) and path (4) in FIG. 5. Additionally, the previous path timing can be maintained even when a path is temporarily lost due to shadowing.

Figure 7:
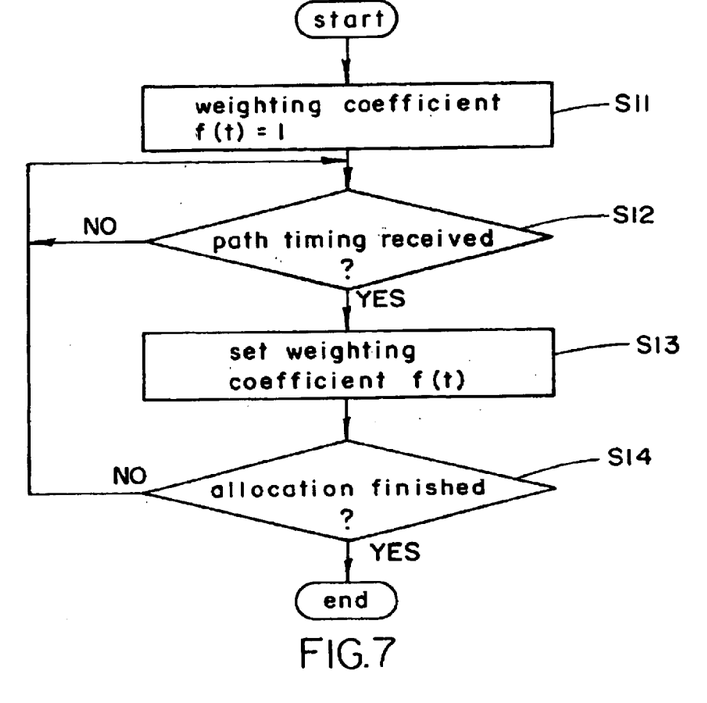
FIG. 7 is a flow chart showing a setting procedure for a weighting coefficient with a state weighting section shown in FIG. 3.

Referring to FIG. 7, there is shown a flow chart showing a procedure to set a weighting coefficient by state weighting section 13 in FIG. 4. The procedure to set a weighting coefficient by state weighting section 13 will be explained with reference to FIG. 4 and FIG. 7.

At step S11, state weighting section 13 sets weighting coefficient f(t)=1 at the start of a path allocating procedure. Thereafter, at step S12, when path timing is received from rake path allocating unit 15 to respectively allocated finger receivers 5, state weighting section 13 sets weighting coefficient f(t) in state weighting based on the path timing at step S13. At step S14, a check is made to determine whether path allocation is completed, and the procedure returns to step S12 if it is not completed. With this procedure, the setting procedure for the weighting coefficient is repeatedly performed until path allocation is completed.

Figure 8:
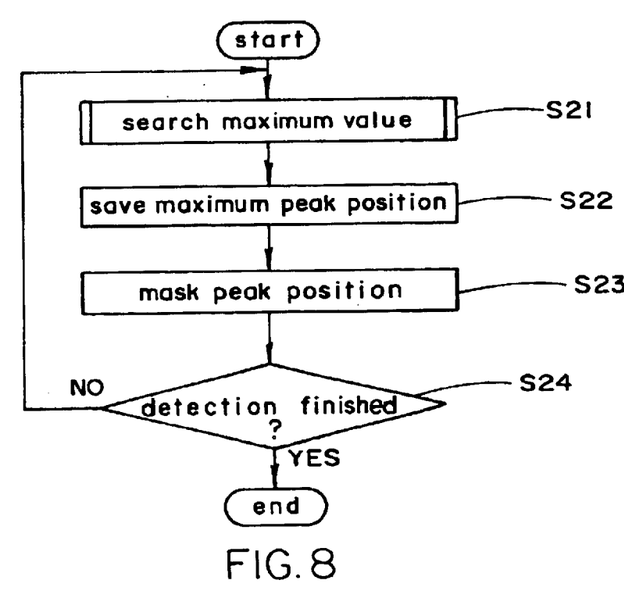
FIG. 8 is a flow chart showing a procedure of a correlation peak position detecting unit shown in FIG. 3.

Referring to FIG. 8, there is shown a flow chart showing the procedure of correlation peak position detecting unit 14 in FIG. 3. Description is made for the procedure of correlation peak position detecting unit 14 with reference to FIG. 4 and FIG. 8.

At step S21, correlation peak position detecting unit 14 searches a maximum value for detecting a plurality of peaks, and saves a detected maximum peak position in a memory at step S22. Thereafter, step S23, correlation peak position detecting unit 14 masks i.e. sets to zero data on the detected maximum peak position. Specifically, correlation peak position detecting unit 14 removes data on the detected peak position from the range under detection by masking the data on the maximum peak position. At step S24, a check is made to determine whether detection of a specified number of correlation peaks is completed, and the procedure returns to step S21 if it is not completed. In this manner, procedures as described above are repeatedly performed for data on the remaining peak positions for the preset number of peaks to be detected.

Figure 9:
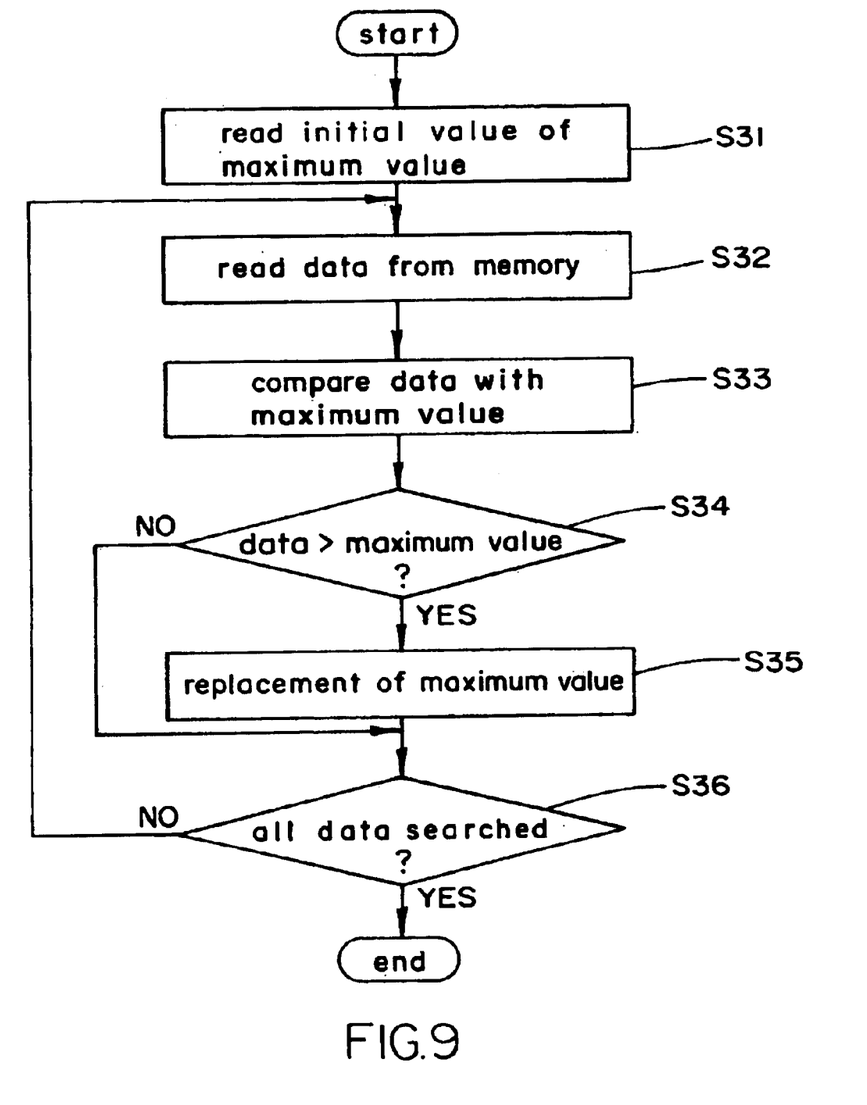
FIG. 9 is a flow chart showing a maximum value searching procedure with the correlation peak position detecting unit shown in FIG. 3.

Referring to FIG. 9, there is shown a flow chart showing a procedure to search a maximum value performed by correlation peak position detecting unit 14 in FIG. 3. Description is made for the procedure for searching a maximum value by correlation peak position detecting unit 14 with reference to FIG. 4 and FIG. 9.

At step S31, correlation peak position detecting unit 14 reads an initial value of a maximum value (for example, sets the first value of data) and sets a search start address. Subsequently, at step S32, correlation peak position detecting unit 14 reads data from a memory (not shown) and advances a read address to the next data position.

At step S33 and S34, correlation peak position detecting unit 14 determines whether the data read from the memory is higher than the maximum value data. If the data is higher than the maximum value, correlation peak position detecting unit 14 makes replacement of the maximum value and saves the path timing of the maximum value in the memory at step S35. At step S36, a check is made to determine whether all of data has been searched, and the procedure returns to step S32 if it has not been searched. With this procedure, correlation peak position detecting unit 14 repeatedly performs procedures as described above until all of data to be searched has been compared with the maximum value.

While multiplier 12 is used to weight a delay profile for the path timing allocated to finger receivers 5 in the embodiment, an adder or the like may be used therefor, or a subtracter or divider may be used to weight positions which are not allocated to finger receivers 5.

Second Embodiment

Figure 10:
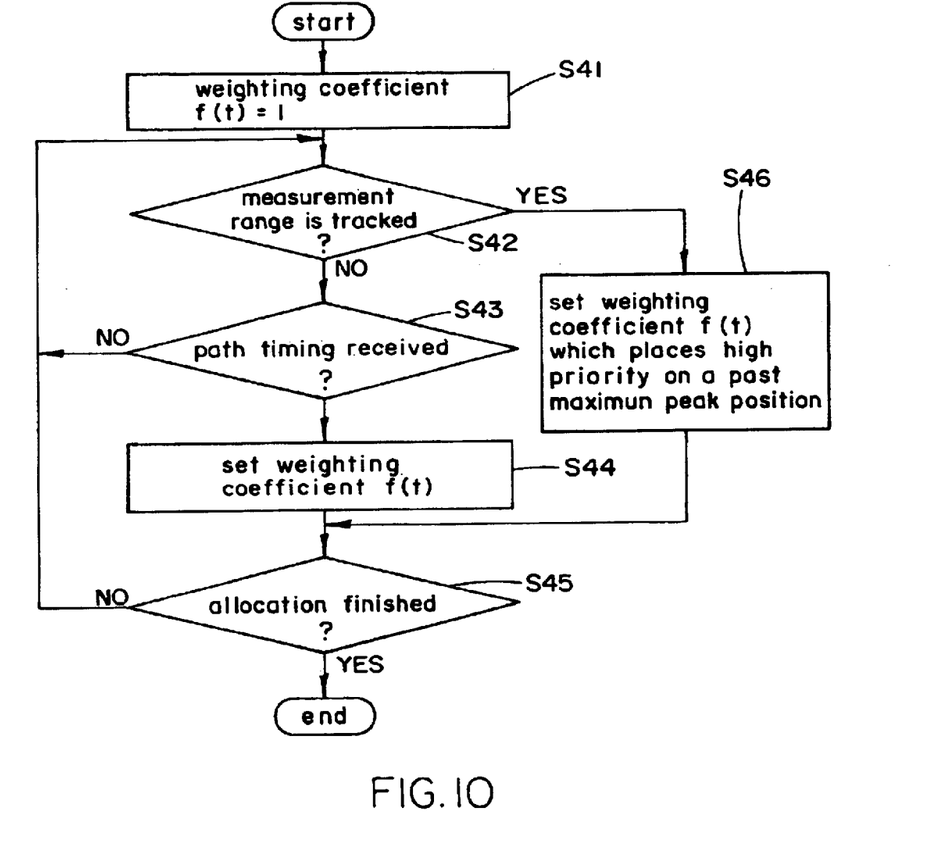
FIG. 10 is a flow chart showing a setting procedure for a weighting coefficient with a state weighting section according to another embodiment of the present invention.

FIG. 10 is a flow chart showing a procedure to set a weighting coefficient with a state weighting section in a CDMA receiver according to a second embodiment of the present invention. The configuration of a multipath search unit according to the embodiment is identical to that of the multipath search unit according to the first embodiment shown in FIG. 4 except for a state weighting section. Description is made for the setting procedure for a weighting coefficient with the state weighting section according to the second embodiment of the present invention with reference to FIG. 4 and FIG. 10.

At the start of a path allocating procedure, at step S41, state weighting section 13 sets weighting coefficient f(t)=1. Thereafter, at step S42, state weighting section 13 determines whether path search unit 1 tracks a range of measurement of a delay profile such that a path with a maximum reception peak power is centered. If it is determined that path search unit 1 tracks the range in such a manner at step S42, state weighting section 13 sets a coefficient which places high priority only on a past maximum peak position as weighting coefficient f(t) in state weighting at step S46.

On the other hand, if it is determined that path search unit 1 does not track the range in the aforementioned manner at step S42 and path timing allocated to respective finger receivers 5 is received from rake path allocating unit 15 at step S43, state weighting section 13 sets weighting coefficient f(t) in state weighting based on the path timing at step S44. At step S45, a check is made to determine whether path allocation is completed, and the procedure returns to step S42 if it is not completed. With this procedure, the procedure to set a weighting coefficient is repeatedly performed until the path allocation procedure is completed.

As described above, when the path search unit tracks the delay profile measured range such that a path with a maximum reception peak power is centered, frequent changes of measured positions can be prevented by multiplying a coefficient which places high priority only on a past maximum peak position. This also can prevent frequent changes of reception timing, thereby making it possible to prevent frequent changes of transmission timing controlled in accordance with the reception timing as well.

Third Embodiment

Figure 11:
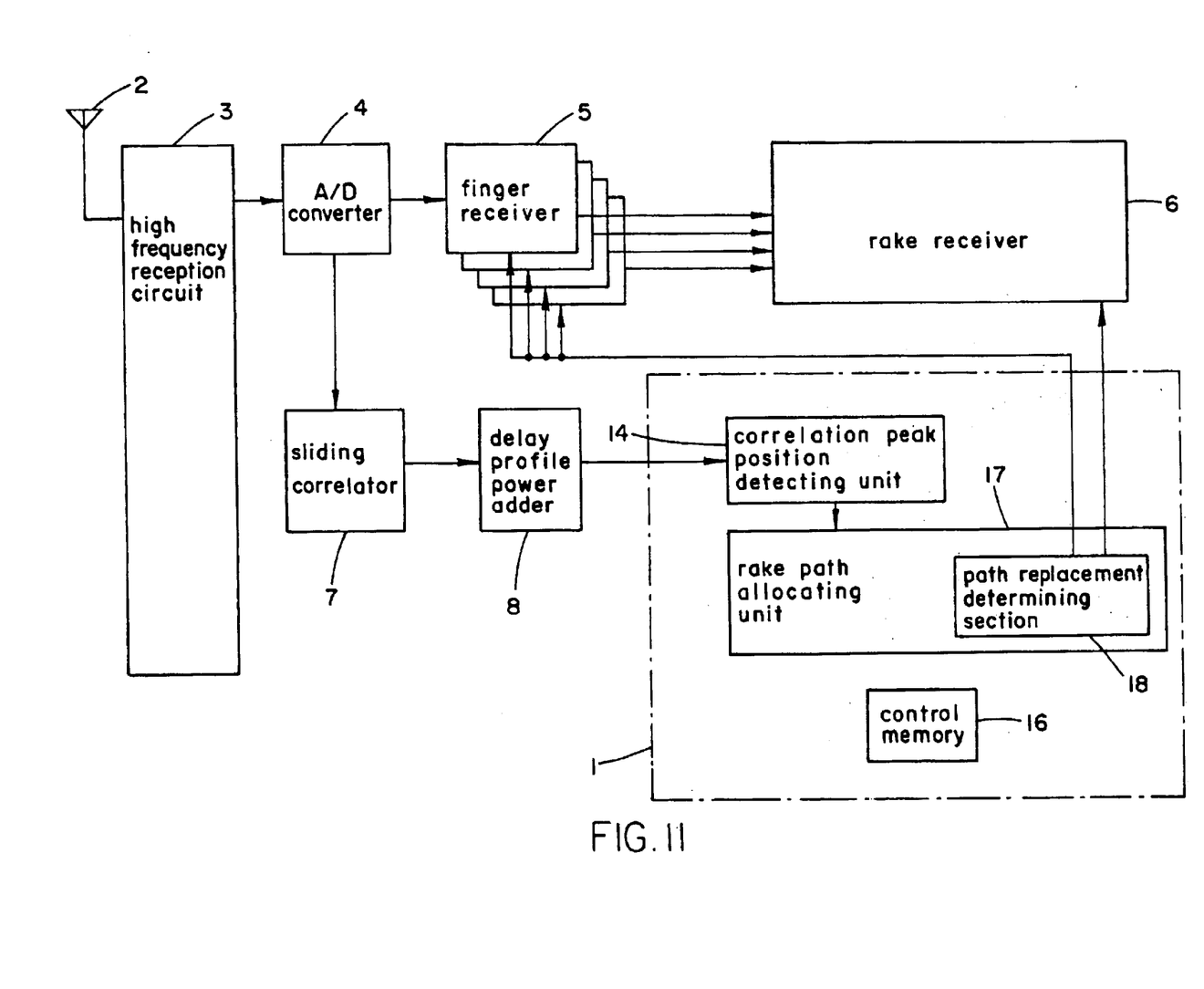
FIG. 11 is a block diagram showing a configuration of a multipath search unit of a CDMA receiver according to another embodiment of the present invention.

Referring to FIG. 11, there is shown a block diagram showing a configuration of a multipath search unit of a CDMA receiver according to a third embodiment of the present invention. The multipath search unit according to the embodiment is implemented with a DSP and operates under program control similarly to the first embodiment.

Additionally, the CDMA receiver according to the present embodiment has a configuration similar to that of the first embodiment except that weighting is performed by rake path allocating unit 17 in multipath search unit 1 instead of weighting unit 11 shown in FIG. 4, and the same components are assigned the same reference numerals. The procedure of the same components are similar to those in the first embodiment.

Rake path allocating unit 17 includes a path replacement determining section 18 for weighing of path timing allocated to finger receivers 5. Path replacement determining section 18 determines whether replacement of paths is made or not by comparing a level of a new candidate path with the result of operation (multiplication, addition or the like) of a level of a path allocated to finger receiver 5 and a frequent replacement preventing coefficient (corresponding to the aforementioned weighting coefficient).

Figure 12:
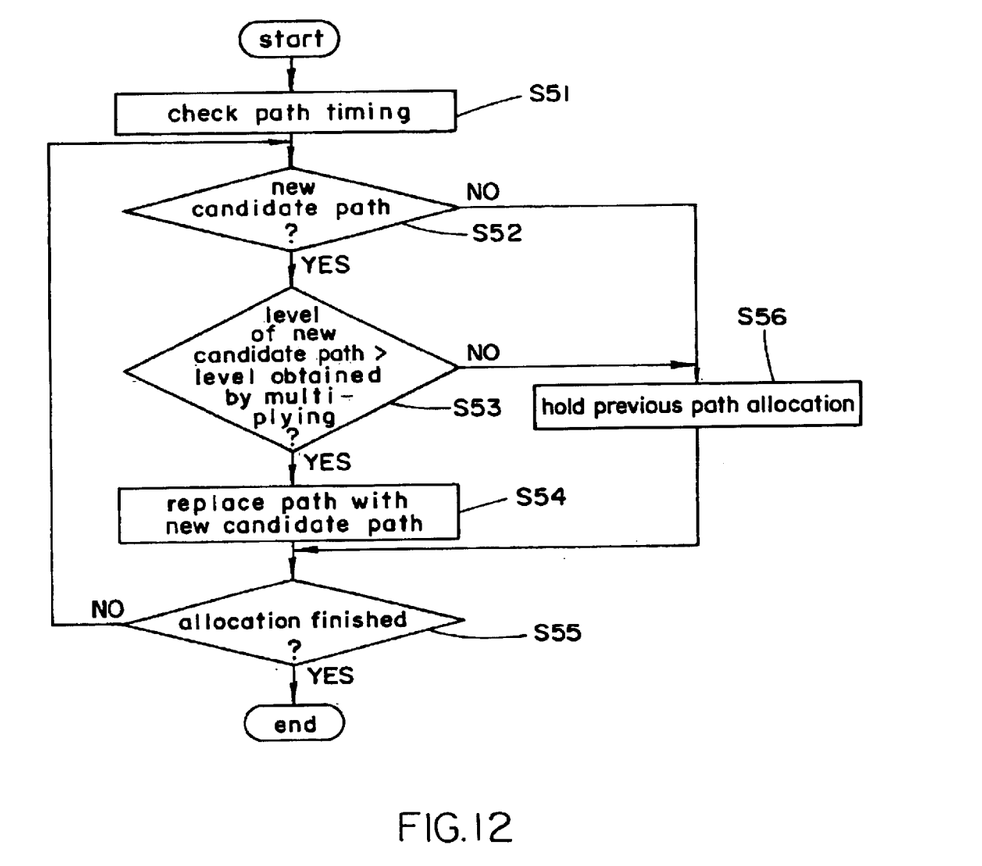
FIG. 12 is a flow chart showing a path replacement determining procedure with a path replacement determining section shown in FIG. 11.

FIG. 12 is a flow chart showing a procedure of path replacement determining section 18 in FIG. 11. Description is made for a detailed procedure of multipath search unit 1 according to the embodiment with reference to FIG. 11 and FIG. 12. It should be noted that the procedure shown in FIG. 12 can be implemented by executing programs in control memory 16 by means of path replacement determining section 18. Control memory 16 may be embodied as a ROM, floppy disk or the like.

Signals received at antenna 2 are down-converted at high-frequency reception circuit 3 and converted to digital signals at A/D converter 4. Sliding correlator 7 measures a delay profile from the signals digitally converted at A/D converter 4.

Delay profile power adder 8 performs averaging for deriving an average of a plurality of delay profiles measured at sliding correlator 7 to reduce path variations due to fading or the like. The resultant delay profile after the path variations are reduced at delay profile power adder 8 is supplied to correlation peak position detecting unit 14. Correlation peak position detecting unit 14 detects path timing of upper N peaks from the delay profile.

At step S51, rake path allocating unit 17 checks the path timing detected at correlation peak position detecting unit 14 by path replacement determining section 18, and determines whether there is a new candidate path at step S52. If there is no new candidate path, path replacement determining section 18 maintains the previous path allocation at step S56.

On the other hand, if there is a new candidate path, path replacement determining section 18 compares the level of the new candidate path with a value obtained by multiplying a level of a path allocated to finger receiver 5 by a frequent replacement preventing coefficient (for example, a value obtained by multiplying the level of the path by 1.5 as a frequent replacement preventing coefficient) at step S53.

If it is determined that the value multiplied by the frequent replacement preventing coefficient is greater than the level of the new candidate path at step S53, path replacement determining section 18 maintains the previous path allocation at step S56.

If it is determined that the value multiplied by the frequent replacement preventing coefficient is smaller than the level of the new candidate path at step S53, path replacement determining section 18 replaces the path previously allocated to finger receiver 5 with the new candidate path at step S54.

At step S55, a check is made to determine whether path allocation is completed, and the procedure returns to step S52 if it is not completed. With this procedure, a path replacing procedure with path replacement determining section 18 is repeatedly performed until path allocation is completed.

It should be noted that while the frequent replacement preventing coefficient is multiplied by the level of the path allocated to finger receiver 5 in the procedure at step S53 with path replacement determining section 18, the frequent replacement preventing coefficient may be added thereto. Additionally, the frequent replacement preventing coefficient may be multiplied by, subtracted from, or divided by the level of the new candidate path such that high priority is placed on the path presently allocated to finger receiver 5 in the next path allocation procedure.

Rake path allocating unit 17 transmits paths allocated in a path replacement procedure with path replacement determining section 18 to respective finger receivers 5. As a result, when a delay profile is measured next time, data on the paths presently allocated to respective finger receivers 5 is processed with high priority.

This provides hysteresis for path replacement, and frequent path switching can be prevented between paths at approximate levels. The previous path timing can be maintained even when a path is temporarily lost due to shadowing.

Figure 13:
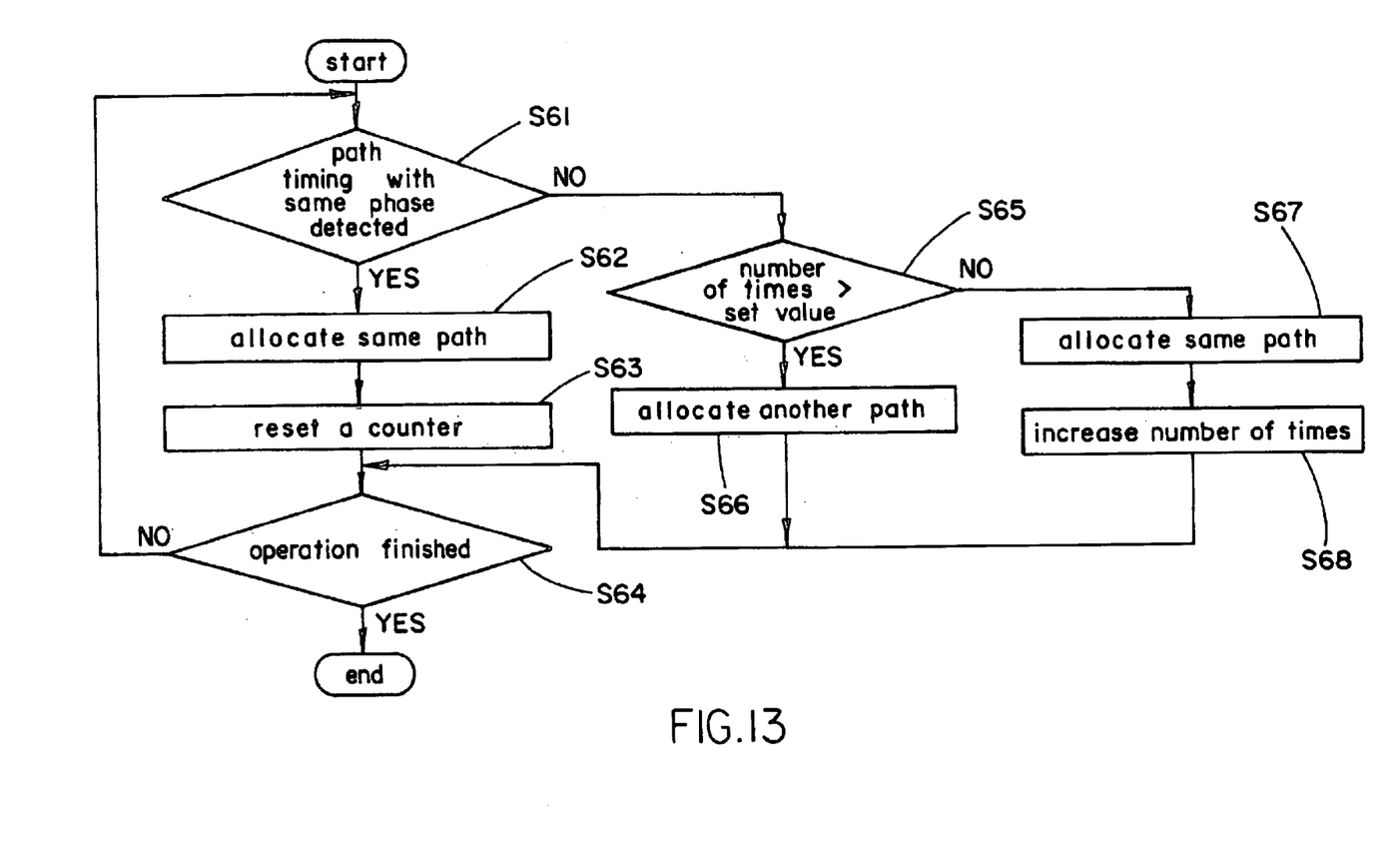
FIG. 13 is a flow chart showing a protecting procedure for the previous path timing according to the other embodiment of the present invention.

Referring to FIG. 13, description is made for a protecting procedure for the previous path timing in the CDMA receiver according to the embodiment.

When path replacement determining section 18 detects path timing with the same phase as path timing of a path allocated to a certain finger receiver at step S61, it allocates the same path timing as the previous path timing to that finger receiver at step S62. At step S63, path replacement determining section 18 resets a counter (not shown) for counting the number of times the previous path timing can not be detected.

On the other hand, when path replacement determining section 18 fails to detect path timing with the same phase as path timing of a path allocated to a certain finger receiver at step S61, it compares the number of times the previous path timing can not be detected as mentioned above with a previously set value at step S65. If the number of times the previous path timing can not be detected is greater than the set value, path replacement determining section 18 allocates another path to that finger receiver instead of the previous path timing at step S66.

If the number of times the previous path timing can not be detected is smaller than the set value at step S65, path replacement determining section 18 allocates the same path timing as the previous path timing to that finger receiver at step S67. At step S68, path replacement determining section 18 increments by one the number of times the previous path timing can not be detected. Path replacement determining section 18 determines whether the path timing protecting procedure is completed at step S64, and the procedure returns to step S61 if it is determined that the procedure is not completed. With this procedure, path replacement determining section 18 performs procedures from S61 to S68 until the protecting procedure for the previous path timing is completed.

Figure 14:
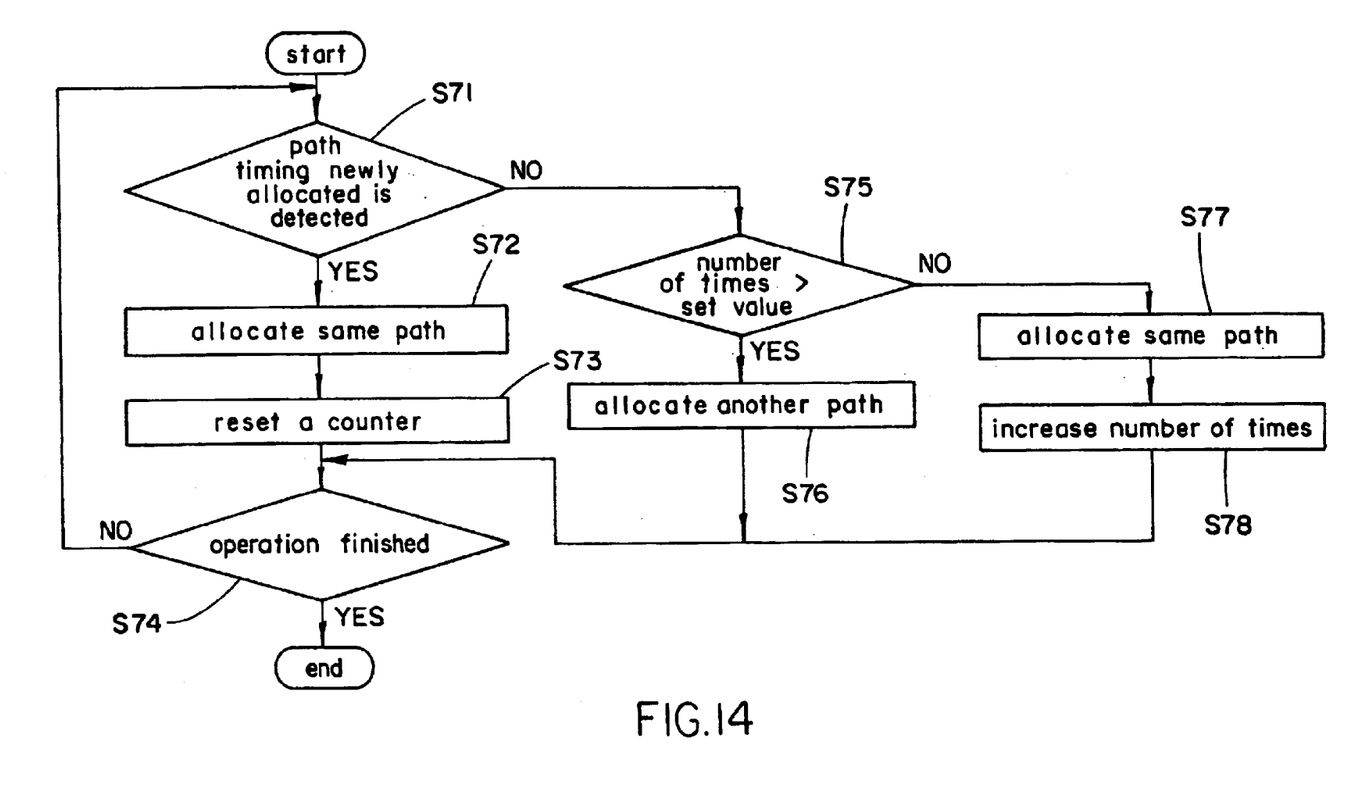
FIG. 14 is a flow chart showing a protecting procedure for newly allocated path timing according to the other embodiment of the present invention.

Next, description is made for a protecting procedure for newly allocated path timing in the CDMA receiver according to the embodiment with reference to FIG. 14.

When path replacement determining section 18 detects path timing with the same phase as path timing of a path to be newly allocated to a certain finger receiver at step S71, it allocates the same path timing as the path timing to be newly allocated at step S72. At step S73, path replacement determining section 18 resets a counter (not shown) for counting the number of times newly allocated path timing can not be detected.

On the other hand, when path replacement determining section 18 fails to detect path timing with the same phase as path timing of a path to be newly allocated to a certain finger receiver at step S71, it compares the number of times the aforementioned newly allocated path timing can not be detected as mentioned above with a previously set value at step S75. If the number of times the aforementioned newly allocated path timing can not be detected is greater than the set value, path replacement determining section 18 allocates another path timing to that finger receiver instead of the newly allocated path timing at step S76.

If the number of times the aforementioned newly allocated path timing can not be detected is smaller than the set value at step S75, path replacement determining section 18 allocates the same path timing as newly allocated path timing to that finger receiver at step S77. At step S78, path replacement determining section 18 increments by one the number of times newly allocated path timing can not be detected. Path replacement determining section 18 determines whether the protecting procedure for newly allocate path timing is completed at step S74, and the procedure returns to step S71 if it is determined that the procedure is not completed. With this procedure, path replacement determining section 18 performs procedures from S71 to S78 until the protecting procedure for newly allocated path timing is completed.

Thus, frequent switching of path allocation to finger receivers 5 can be prevented even under a communication environment where noise due to multipath is observed at substantially the same level, thereby improving reception characteristics.

Path timing for finger receivers 5 is assured even when a path is temporarily lost due to shadowing or the like, resulting in improved reception characteristics. Additionally, conditional branch decision in path switching or the like is simplified, which leads to a simplified hardware or software configuration.

While the description and configurations in the aforementioned respective embodiments illustrate processing for a signal received from one base station for simplifying operational description, a CDMA receiver generally processes signals received from a plurality of base stations, in which case the aforementioned processing may be performed for respective signals received from respective base station in soft handover or the like. In this case, the aforementioned respective circuits may be provided for each base station, or may be shared among respective base stations.

In addition, operation may be performed between a peak which satisfies predetermined conditions from peaks detected with the aforementioned method, for example the third correlation peak in a delay profile, and a weighing coefficient when the third correlation peak and the fourth correlation peak have substantially the same power values in a rake receiver with three finger receivers. In this case, since frequent replacement of the third path timing with the fourth path timing because of variations in propagation path is eliminated, frequent switching of allocated path timing (despread timing) is eliminated in one of finger receivers, allowing improved reception characteristics.

While preferred embodiments of the present invention have been described using specific terms, such description is for illustrative purposes only, and it is to be understood that changes and variations may be made without departing from the spirit or scope of the following claims.

What is claimed is:

1. A CDMA receiver including a plurality of finger receivers each for performing despread for one path to provide symbol synchronization, said CDMA receiver comprising:

calculating means for calculating a state weighting coefficient based on the present path allocation to said plurality of finger receivers;

operational means for performing a predetermined calculation between said state weighting coefficient calculated by said calculating means and a delay profile representing signal power distribution with respect to a delay time of a received signal to the path; and search means for searching a plurality of paths from the result of the predetermined calculation by said operational means.

2. The CDMA receiver according to claim 1, wherein said operational means performs a predetermined calculation between said state weight coefficient and a delay profile corresponding to paths presently allocated to said plurality of finger receivers.

3. The CDMA receiver according to claim 2, wherein said calculating means calculates as said state weighting coefficient a coefficient that makes the peak value at a path timing presently allocated to said plurality of finger receivers high.

4. The CDMA receiver according to claim 1, wherein said operational means performs a predetermined calculation between said state weight coefficient and a delay profile corresponding to paths not allocated presently to said plurality of finger receivers.

5. The CDMA receiver according to claim 4, wherein said calculating means calculates as said state weighting coefficient a coefficient that makes the peak value at a path timing not allocated presently to said plurality of finger receivers low.

6. The CDMA receiver according to claim 1, wherein said operational means performs a predetermined calculation between said state weighting coefficient and a delay profile corresponding to a new candidate path obtained from the search of the plurality of paths or to any of paths presently allocated to said plurality of finger receivers.

7. The CDMA receiver according to claim 1, wherein when a range of measurement of the delay profile is tracked such that a path with a maximum reception peak power is centered, said calculating means calculates as said state weighting coefficient a coefficient that gives a high priority only to a past maximum peak position.

8. The CDMA receiver according to claim 1, wherein said calculating means calculates as said state weighting coefficient a coefficient that makes a peak level high at path timing satisfying predetermined conditions from among path timing presently allocated to said plurality of finger receivers.

9. The CDMA receiver according to claim 1, further comprising means for allocating a plurality of paths detected by said search means to said plurality of finger receivers respectively.

10. The CDMA receiver according to claim 9, wherein said operational means performs a predetermined calculation between said state weight coefficient and a delay profile corresponding to paths presently allocated to said plurality of finger receivers.

11. The CDMA receiver according to claim 10, wherein said calculating means calculates as said state weighting coefficient a coefficient that makes the peak value at a path timing presently allocated to said plurality of finger receivers high.

12. The CDMA receiver according to claim 9, wherein said operational means performs a predetermined calculation between said state weight coefficient and a delay profile corresponding to paths not allocated presently to said plurality of finger receivers.

13. The CDMA receiver according to claim 12, wherein said calculating means calculates as said state weighting coefficient a coefficient that makes the peak value at a path timing not allocated presently to said plurality of finger receivers low.

14. The CDMA receiver according to claim 9, wherein said operational means performs a predetermined calculation between said state weighting coefficient and a delay profile corresponding to a new candidate path obtained from the search of the plurality of paths or to any of paths presently allocated to said plurality of finger receivers.

15. The CDMA receiver according to claim 9, wherein when a range of measurement of the delay profile is tracked such that a path with a maximum reception peak power is centered, said calculating means calculates as said state weighting coefficient a coefficient that gives a high priority only to a past maximum peak position.

16. The CDMA receiver according to claim 9, wherein said calculating means calculates as said state weighting coefficient a coefficient that makes a peak level high at path timing satisfying predetermined conditions from among path timing presently allocated to said plurality of finger receivers.

17. A CDMA receiver including a plurality of finger receivers each for performing despread for one path to provide symbol synchronization, said CDMA receiver comprising:

search means for searching a plurality of paths from a delay profile representing signal power distribution with respect to a delay time of a received signal to the path; and determining means for performing a predetermined calculation between a delay profile corresponding to a new candidate path obtained by said search means or to any of paths presently allocated to said plurality of finger receivers and a previously set weighting coefficient and for determining whether the new candidate path or any of paths presently allocated to said plurality of finger receivers is to be allocated to said plurality of finger receivers from the result of the predetermined calculation.

18. A method of allocating a plurality of paths to a plurality of finger receivers in a CDMA receiver, each of said plurality of finger receivers for performing despread for one path to provide symbol synchronization, said method comprising the steps of:

calculating a state weighting coefficient based on the present path allocation to said plurality of finger receivers;

performing a predetermined calculation between said calculated state weighting coefficient and a delay profile representing signal power distribution with respect to a delay time of a received signal to the path; and searching a plurality of paths from the result of the predetermined calculation.

19. The method according to claim 18, wherein said step of performing a predetermined calculation between the state weighting coefficient and the delay profile comprises the step of performing a predetermined calculation between a delay profile corresponding to paths presently allocated to said plurality of finger receivers and the state weight coefficient.

20. The method according to claim 19, wherein said step of calculating the state weighting coefficient comprises the step of calculating as the state weighting coefficient a coefficient that makes the peak level at a path timing presently allocated to said plurality of finger receivers high.

21. The method according to claim 18, wherein said step of performing a predetermined calculation between said state weighting coefficient and the delay profile comprises the step of performing a predetermined calculation between a delay profile corresponding to paths not allocated presently to said plurality of finger receivers and said state weight coefficient.

22. The method according to claim 21, wherein said step of calculating the state weighting coefficient comprises the step of calculating as said state weighting coefficient a coefficient that makes the peak level at a path timing not allocated presently to said plurality of finger receivers low.

23. The method according to claim 18, wherein said step of performing predetermined calculation between said state weighting coefficient and the delay profile comprises the step of performing a predetermined calculation between a delay profile corresponding to a new candidate path obtained from the search of the plurality of paths or to any of paths presently allocated to said plurality of finger receivers and said state weighting coefficient.

24. The method according to claim 18, wherein said step of calculating the state weighting coefficient comprises the step of calculating as said state weighting coefficient, when a range of measurement of the delay profile is tracked such that a path with a maximum reception peak power is centered, a coefficient such that high priority is placed only on a past maximum peak position.

25. The method according to claim 18, wherein said step of calculating the state weighting coefficient comprises the step of calculating as said state weighting coefficient a coefficient that makes a peak level high at path timing satisfying predetermined conditions from among path timing presently allocated to said finger receivers.

26. The method according to claim 18, further including the step of allocating a plurality of paths detected to said plurality of finger receivers respectively.

27. The method according to claim 26, wherein said step of performing a predetermined calculation between said state weighting coefficient and the delay profile comprises the step of performing a predetermined calculation between a delay profile corresponding to paths presently allocated to said plurality of finger receivers and said state weight coefficient.

28. The method according to claim 27, wherein said step of calculating the state weighting coefficient comprises the step of calculating as said state weighting coefficient a coefficient that makes a peak level at path timing presently allocated to said plurality of finger receivers high.

29. The method according to claim 28, wherein said step of performing a predetermined calculation between said state weighting coefficient and the delay profile comprises the step of performing a predetermined calculation between a delay profile corresponding to paths not allocated presently to said plurality of finger receivers and said state weight coefficient.

30. The method according to claim 29, wherein said step of calculating the state weighting coefficient comprises the step of calculating as said state weighting coefficient a coefficient that makes a peak level at path timing not allocated presently to said plurality of finger receivers low.

31. The method according to claim 26, wherein said step of performing a predetermined calculation between said state weighting coefficient and the delay profile comprises the step of performing a predetermined calculation between a delay profile corresponding to a new candidate path obtained from the search of the plurality of paths or to any of paths presently allocated to said plurality of finger receivers and said state weighting coefficient.

32. The method according to claim 26, wherein said step of calculating the state weighting coefficient comprises the step of calculating as said state weighting coefficient, when a range of measurement of the delay profile is tracked such that a path with a maximum reception peak power is centered, a coefficient such that high priority is placed only on a past maximum peak position.

33. The method according to claim 26, wherein said step of calculating the state weighting coefficient comprises the step of calculating as said state weighting coefficient a coefficient that makes a peak level high at path timing satisfying predetermined conditions from path timing presently allocated to said plurality of finger receivers.

34. A method of allocating a plurality of paths to a plurality of finger receivers in a CDMA receiver, each of said plurality of finger receivers for performing despread for one path to provide symbol synchronization, said method comprising the steps of:

searching a plurality of paths from a delay profile representing signal power distribution with respect to a delay time of a received signal to the path; and performing a predetermined calculation between a delay profile corresponding to a new candidate path obtained by said search means or to any of paths presently allocated to said plurality of finger receivers and a previously set weighting coefficient to determine whether the new candidate path or any of paths presently allocated to said plurality of finger receivers is allocated to said plurality of finger receivers from the result of the predetermined calculation.

* * * * *